(12) United States Patent
Gerber

(10) Patent No.: US 8,589,283 B2
(45) Date of Patent: Nov. 19, 2013

(54) METHOD AND SYSTEM FOR LOAN APPLICATION NON-ACCEPTANCE FOLLOW-UP

(75) Inventor: Raymond Gerber, Duluth, GA (US)

(73) Assignee: CCIP Corp., Henderson, NV (US)

( * ) Notice: Subject to any disclaimer, the term of this patent is extended or adjusted under 35 U.S.C. 154(b) by 1455 days.

(21) Appl. No.: 11/856,785

(22) Filed: Sep. 18, 2007

(65) Prior Publication Data
US 2009/0063329 A1 Mar. 5, 2009

Related U.S. Application Data

(60) Provisional application No. 60/969,114, filed on Aug. 30, 2007.

(51) Int. Cl.
G06Q 40/00 (2012.01)
G06Q 40/02 (2012.01)

(52) U.S. Cl.
CPC .................................. *G06Q 40/025* (2013.01)
USPC .......................................................... 705/38

(58) Field of Classification Search
None
See application file for complete search history.

(56) References Cited

U.S. PATENT DOCUMENTS

| | | | |
|---|---|---|---|
| 5,535,322 A | 7/1996 | Hecht | |
| 5,581,691 A | 12/1996 | Hsu et al. | |
| 5,682,469 A | 10/1997 | Linnett et al. | |
| 5,699,527 A | 12/1997 | Davidson | |
| 5,785,595 A | 7/1998 | Gauselmann | |
| 5,946,388 A | 8/1999 | Walker et al. | |
| 5,956,024 A | 9/1999 | Strickland et al. | |
| 6,064,731 A | 5/2000 | Flockhart et al. | |
| 6,088,686 A | 7/2000 | Walker et al. | |
| 6,144,955 A | 11/2000 | Tsuiki et al. | |
| 6,233,566 B1 | 5/2001 | Levine et al. | |
| 6,327,362 B1 | 12/2001 | Hull et al. | |
| 6,385,584 B1 | 5/2002 | McAllister et al. | |
| 6,424,968 B1 | 7/2002 | Broster et al. | |

(Continued)

OTHER PUBLICATIONS

Third Party Submission of Comments Under Peer Reviewed Prior Art Pilot Program. Submitted by Tom Lemmo for Beth Noveck. Jul. 9, 2009. Includes US Patent Application 20030206622 by Robin H. Foster (filed Jul. 30, 1999); US Patent 6611816 to lending Tree Inc. (filed Feb. 22, 2002); "First Franklin . . . Customer Needs", by bNet (Pub date May 8, 2000).*

(Continued)

*Primary Examiner* — Kambiz Abdi
*Assistant Examiner* — Stephanie M Ziegle
(74) *Attorney, Agent, or Firm* — Philip H. Burrus, IV

(57) ABSTRACT

Methods and systems for facilitating post offer communication with a prospective borrower using an on-line lending system (110) are provided. The post offer communication is in response to non-acceptance of an electronic loan offer. The on-line lending system receives an electronic loan application (100) from client terminal (101). The electronic loan application (100) contains applicant credential data, such as personal information (202) and financial information (302). When a loan offer (500) is presented on the client terminal (101), the on-line lending system (110) waits a predetermined time for an electronic signal indicating acceptance of the loan offer (500). When such electronic signal is not received within the predetermined time, a pending loan offer application (800) is transmitted to a call center terminal (1414). Upon receipt of the pending loan offer application (800), the call center terminal (1414) presents an electronically generated prompt (1415) for electronically generated prompt (1415) a customer service representative to initiate communication with the prospective borrower.

20 Claims, 14 Drawing Sheets

(56) References Cited

U.S. PATENT DOCUMENTS

| | | |
|---|---|---|
| 6,434,230 B1 | 8/2002 | Gabriel |
| 6,493,675 B1 | 12/2002 | Kanaya et al. |
| 6,611,816 B2 * | 8/2003 | Lebda et al. .................... 705/38 |
| 6,691,093 B2 | 2/2004 | Shell |
| 6,952,281 B1 | 10/2005 | Irons et al. |
| 6,983,287 B1 | 1/2006 | Jayanti et al. |
| 7,050,567 B1 | 5/2006 | Jensen |
| 7,178,109 B2 | 2/2007 | Hewson et al. |
| 7,321,298 B2 * | 1/2008 | Judkins et al. ................ 340/506 |
| 7,556,192 B2 | 7/2009 | Wokaty, Jr. |
| 2001/0011228 A1 | 8/2001 | Shenkman |
| 2001/0029482 A1 | 10/2001 | Tealdi et al. |
| 2002/0029188 A1 | 3/2002 | Schmid |
| 2002/0055967 A1 | 5/2002 | Coussement |
| 2002/0059137 A1 | 5/2002 | Freeman et al. |
| 2002/0169816 A1 * | 11/2002 | Meiri ........................... 709/104 |
| 2003/0135451 A1 | 7/2003 | O'Brien et al. |
| 2003/0172135 A1 | 9/2003 | Bobick et al. |
| 2003/0212904 A1 | 11/2003 | Randle et al. |
| 2003/0225692 A1 | 12/2003 | Bosch et al. |
| 2003/0233316 A1 | 12/2003 | Hu et al. |
| 2004/0034592 A1 | 2/2004 | Hu et al. |
| 2004/0044772 A1 | 3/2004 | Harkin |
| 2004/0215552 A1 | 10/2004 | Horn et al. |
| 2004/0267665 A1 | 12/2004 | Nam et al. |
| 2005/0026129 A1 | 2/2005 | Rogers |
| 2005/0055231 A1 * | 3/2005 | Lee .................................... 705/1 |
| 2005/0075964 A1 | 4/2005 | Quinn et al. |
| 2005/0080721 A1 | 4/2005 | Kearney et al. |
| 2005/0102225 A1 | 5/2005 | Oppenheimer et al. |
| 2005/0125348 A1 | 6/2005 | Fulton et al. |
| 2005/0148338 A1 * | 7/2005 | Baumeister et al. .......... 455/455 |
| 2006/0031159 A1 | 2/2006 | Minot et al. |
| 2006/0069599 A1 | 3/2006 | Hatoun et al. |
| 2006/0069640 A1 | 3/2006 | Fitzgerald et al. |
| 2006/0265258 A1 | 11/2006 | Powell et al. |
| 2006/0288222 A1 | 12/2006 | Dunkley |
| 2007/0013948 A1 | 1/2007 | Bevan |
| 2007/0028207 A1 | 2/2007 | Nakata et al. |
| 2007/0050285 A1 | 3/2007 | Freeman |
| 2007/0179827 A1 * | 8/2007 | Gupta et al. ...................... 705/8 |
| 2007/0239574 A1 | 10/2007 | Marlow |
| 2008/0126244 A1 * | 5/2008 | Loving et al. ................... 705/38 |
| 2008/0225872 A1 * | 9/2008 | Collins et al. ................. 370/412 |

OTHER PUBLICATIONS

McDermott, Judy "IntraLinks Fax-in to Increas Loan Transaction Efficiency", *Bank Loan Report*. New York: Sep. 20, 2004.
http://www.pega.com/Products/CustomerProcessManager.asp.
http://www.sourcebottle.net/2006/3/5/stealth-ajax.
Ibrahim, Mohamed "Non-Final Office Action", U.S. Appl. No. 11/856,808, filed Sep. 18, 2007, Richard Ali Sullivan, inventor, Mailed May 14, 2010.
WIPO, "International Preliminary Report on Patentability", PCT/US2008/071625, Filed Jul. 30, 2008, Mailed Oct. 22, 2008.
WIPO, "International Preliminary Report on Patentability", PCT/US2008/071617, Filed Jul. 30, 2008, Mailed Oct. 22, 2008.
WIPO, "International Preliminary Report on Patentability", PCT/US2008/071612, Filed Jul. 30, 2010, Mailed Oct. 15, 2008.
Ibrahim, Mohamed "Final Office Action", U.S. Appl. No. 11/856,808, filed Sep. 18, 2007, Richard Ali Sullivan, first inventor, Mailed Oct. 28, 2010.
Kwong, Cho Y., "Non-Final Office Action", U.S. Appl. No. 11/856,817, filed Sep. 18, 2007, Mailed Jul. 5, 2011.
Kwong, Cho Y., "Final Office Action", U.S. Appl. No. 11/856,817, filed Sep. 18, 2007, Mailed Nov. 21, 2011.
Kwong, Cho Y., "NonFinal Office Action", U.S. Appl. No. 11/856,817, filed Sep. 18, 2007, Mailed May 24, 2012.
Kwong, Cho Y., "Final OA", U.S. Appl. No. 11/856,808, filed Sep. 18, 2007, Nov. 14, 2012.

* cited by examiner

CompuCredit CallCenter Application, testuser27

Today is Wednesday, January 31, 2007

Queue information retrieved on: Wednesday, January 31, 2007

Queue Name

- 05_PendingLoanApplicationInProcess_01
- 05_PendingLoanApplicationNew_01
- 05_PendingOffer_01
- 05_Supervisor_01
- 14_Manager_01
- 14_PastDue-0-30-Days_01
- 14_PastDue-31-60-Days_01
- 14_PastDue-61-90-Days_01
- 14_PastDue-91-120-Days_01
- BankruptcyCh07ChargeOff_01
- BankruptcyCh07Confirmed_01
- BankruptcyCh07Unconfirmed_01
- BankruptcyCh13ChargeOff_01
- BankruptcyCh13Confirmed_01
- BankruptcyCh13Unconfirmed_01
- CCCS_01
- CeaseAndDesist-DoNotCall_01
- ContractualChargeOff_01
- Correspondence-Ccenter_01
- Correspondence-Collection_01
- CreditBalance_01
- DeceasedChargeOff_01
- DeceasedConfirmed_01
- DeceasedUnconfirmed_01
- Escalations
- FraudChargeOff_01
- FraudConfirmed_01
- FundingReturns_01
- Mismatch_01
- SSCRA_01
- Settled_01
- SettlementCompletedAndChargeeOff_01
- SettlementReturns_01
- SkipTrace_01
- SuspectFraud_01
- SystemDefault
- UnAttachedDocument_01

METHOD AND SYSTEM FOR LOAN APPLICATION NON-ACCEPTANCE FOLLOW-UP

CROSS REFERENCE TO PRIOR APPLICATIONS

This application claims priority and benefit under 35 U.S.C. §119(e) from U.S. Provisional Application No. 60/969,114, filed Aug. 30, 2007.

BACKGROUND

1. Technical Field

This invention relates generally to an on-line financial lending system for post offer borrower query. Specifically, the invention relates to querying a prospective borrower following their non-acceptance of an on-line, electronic loan offer.

2. Background Art

It is difficult for people to make financial decisions. Creating a monthly budget, saving for retirement, or choosing whether to purchase a new or used car are just some examples of tough financial decisions people face each day.

Some financial decisions are harder to make than others. Taking out a loan is one such decision. The lending process can be a difficult road to navigate, and if not done properly, can even cause future financial problems. It is therefore necessary to make educated decisions when thinking about a loan. Before applying for a loan, many important factors must be carefully analyzed. Some factors include how and when the loan be paid back. Additionally, one must consider how much interest will be paid towards the loan. These are only a few of the issues prospective borrowers may need to consider before borrowing money.

Given that borrowing is such a difficult decision, lending companies often assist borrowers in gathering information. One way this is done is through personal contact. In the past, prospective borrowers had to physically travel to banks or other lending companies to apply for and receive loans. At these financial institutions, lending associates would engage the prospective borrower on a one-on-one basis. Associates could further provide individually tailored loans to each prospective borrower.

More recently, lenders have worked to make the lending process more convenient. One method of doing so is by providing access to loan applications over the Internet. Prospective borrowers may access a lending company's website, fill out and submit a loan application on-line, and receive funds soon thereafter. Electronic loan applications have enabled lending companies to reach a larger and more diverse group of potential borrowers. There are, however, problems associated with this new lending process.

One problem associated with loan applications offered on-line is that personal interaction with the lender is generally not involved. Another problem area in on-line lending is the lack of individual personalization of loan terms. A prospective borrower, when applying for a loan on-line, may not be able to find payment terms to their liking.

There is therefore a need for a method and system for providing lending companies with a solution for limitations and problems caused on-line loan lending practices.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 8 illustrates one embodiment of a prompt presented on a call center terminal to a customer service representative in accordance with the invention.

FIG. 10 illustrates one embodiment of the plurality of queues presented on a call center terminal for selection by a customer service representative in accordance with the invention.

FIG. 12 illustrates one embodiment of a pending loan offer application presented on a call center terminal in accordance with the invention.

Figure 1:
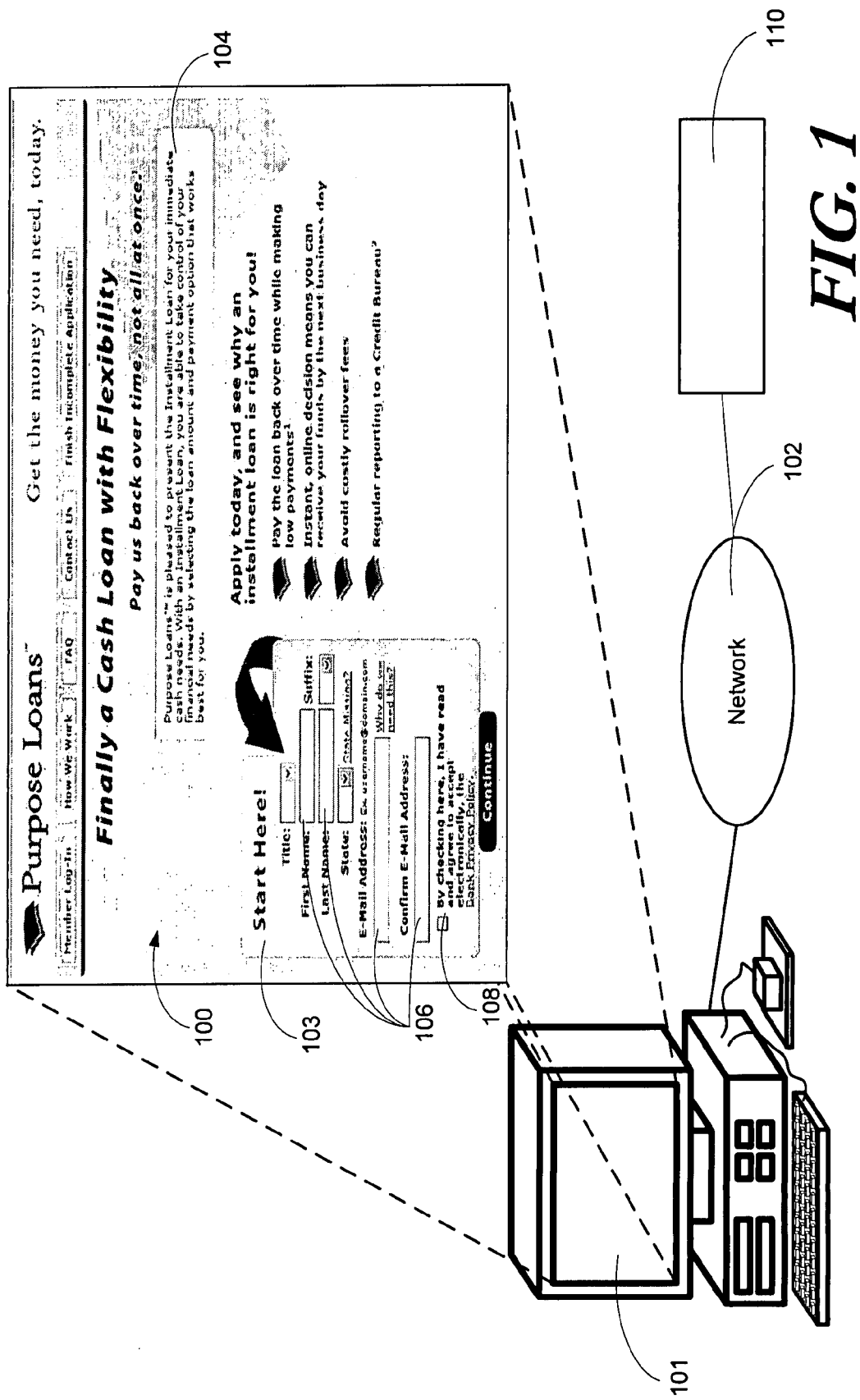
FIG. 1 illustrates one embodiment of an electronic loan application in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to an on-line financial lending system for post offer borrower query. Specifically, the invention relates to querying a prospective borrower following the non-acceptance of a received loan offer. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of post offer borrower query for an on-line financial lending system described herein. As such, these functions may be interpreted as steps of a method to perform post offer borrower query for an on-line financial lending system. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Turning to FIG. 1, illustrated therein is one embodiment of an electronic loan application 100 presented on a client terminal 101. A lender provides prospective borrowers with access to the electronic loan application over a network 102, such as the Internet. In one embodiment, the electronic loan application 100 is stored on an on-line lending company's server, which is coupled with the network 102. The prospective borrower uses a web portal, such as an Internet browser, to access the electronic loan application stored on the web server.

The illustrative embodiment shown in FIG. 1 is that of an electronic loan application 100 comprising a start page 103. In one embodiment, the prospective borrower is first presented with the start page 103 upon accessing the on-line lending company's web server. The start page 103 may comprise company information 104 introducing the prospective borrower to the on-line lending company. The prospective borrower may need to provide at least one piece of personal identification information 106 before continuing to the actual on-line loan application. In one embodiment, the personal identification information 106 is part of applicant credential data. Applicant credential data, as discussed further below, is a compilation of information provided by a prospective borrower for the purpose of applying for a loan.

The personal identification information 106 may include, but is not limited to, a name, an email address, or a user identification name. In one embodiment, the personal identification information 106 is used to facilitate return access to the electronic loan application 100. Return access refers to when the prospective borrower does not complete the electronic loan application 100 but wishes to return to the incomplete electronic loan application 100 at a later date.

In one embodiment, the prospective borrower is required to read and agree to a lender privacy policy 108. This may occur after the personal identification information 106 is entered, but before more of the electronic loan application 100 is presented. Once the prospective borrower has both indicated that the privacy policy 108 has been read and has entered the personal identification information 106, the personal identification information 106 and the acceptance of the lender privacy policy 108 are then transmitted to the on-line lending system 110 over the network 102.

Figure 2:
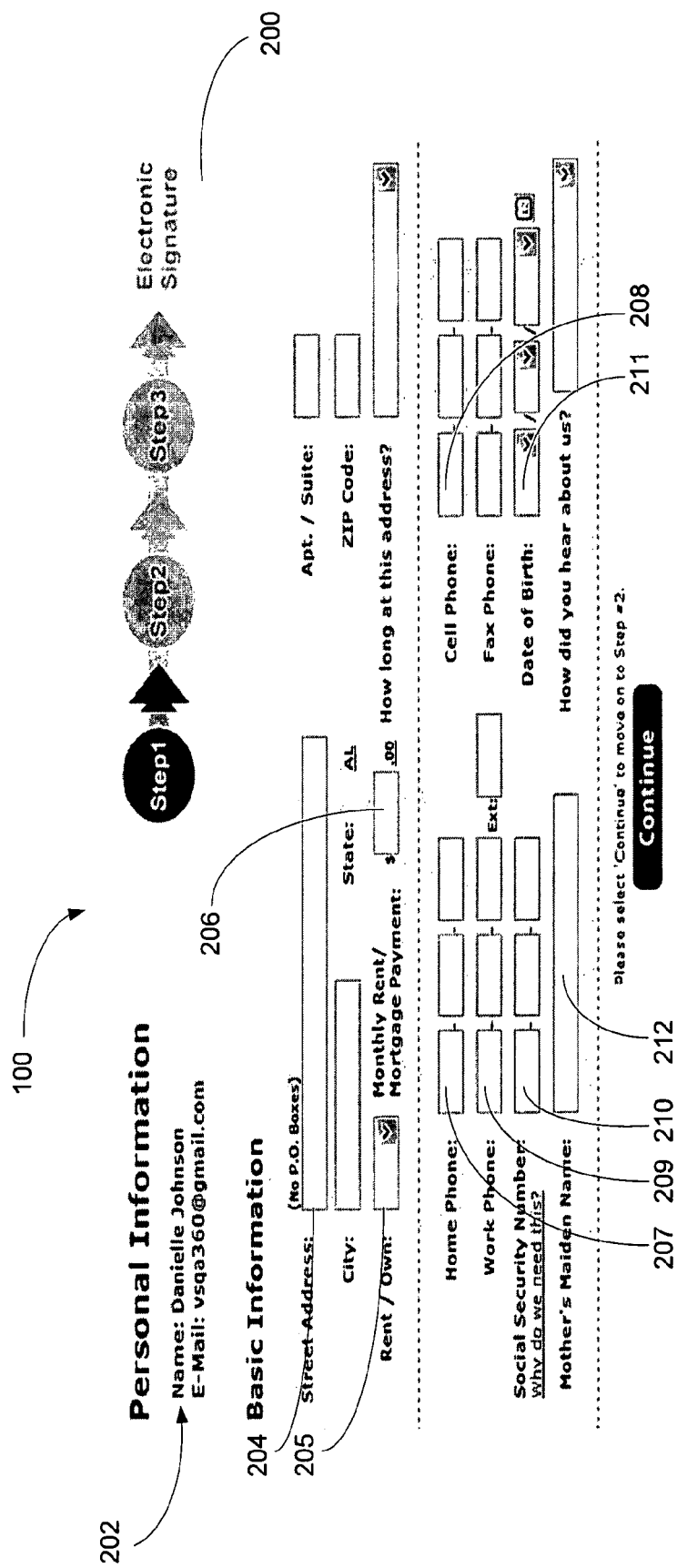
FIG. 2 illustrates one embodiment of an electronic loan application requesting personal information in accordance with the invention.

Turning now to FIG. 2, illustrated therein is one embodiment of the electronic loan application 100 comprising a personal information request page 200 on which a prospective borrower is queried for personal information 202. The personal information request page 200 may be presented to the prospective borrower following the transmission of the personal identification information 106. In one embodiment, the requested personal information 202 includes the prospective borrower's home address 204, residential status (owner or renter) 205, amount of housing payments (mortgage or rent) 206, home telephone number 207, cell phone number 208, work phone number 209, social security number 210, date of birth 211, and mother's maiden name 212. The personal information 202 entered by the prospective borrower is then transmitted to the on-line lending system (110). In one embodiment, the personal information 202 is at least one part of the applicant credential data.

Figure 3:
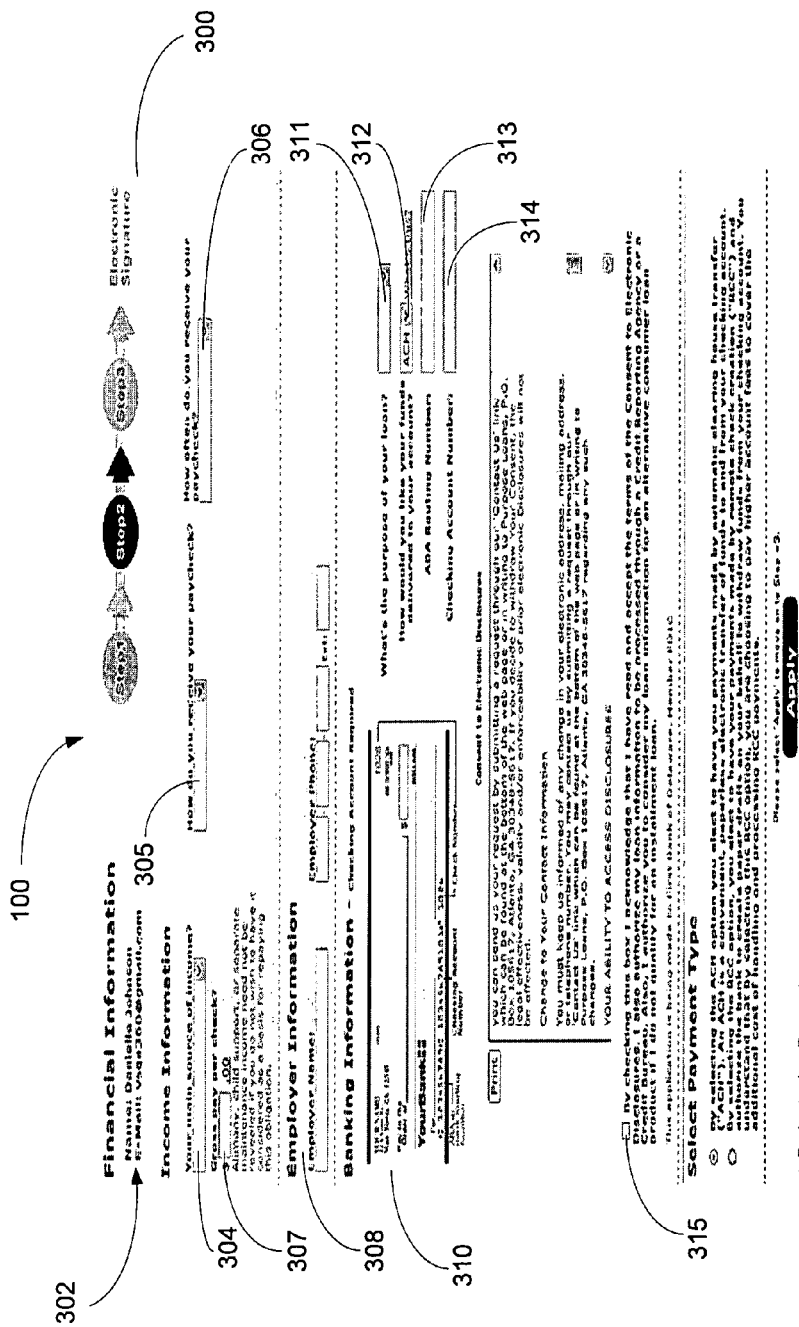
FIG. 3 illustrates one embodiment of an electronic loan application requesting financial information in accordance with the invention.

Turning to FIG. 3, illustrated therein is one embodiment of the electronic loan application 100 comprising a financial information request page 300 on which the prospective borrower is queried for financial information 302. The financial information request page 300 may be presented to the prospective borrower following submission of the personal information 202. In one embodiment, the financial information 302 is used by the on-line lending system (110) to determine whether to approve the prospective borrower, as well as whether to present a loan offer to the prospective borrower. The requested financial information 302 may include, but is not limited to, the prospective borrower's source of income 304, method of receiving paychecks 305, frequency of receiving paychecks 306, amount of paychecks 307, and employer information 308.

In one embodiment, the financial information 302 includes banking information 310. Providing banking information 310 may help expedite repayment of the loan through the electronic transfer of funds from a checking account. Additionally, electronic transfer of funds may reduce the overall cost of the loan to the prospective borrower. In one embodiment an Automatic Clearing House (ACH) is used to facilitate the repaying of the loan offer. Requested banking information may include: a purpose for the loan 311, a method for electronic transfer of funds 312, such as ACH or remote check creation, an American Banking Association (ABA) routing number 313, a checking account number 314, and an acknowledgement of having read terms and conditions 315 corresponding to consent of electronic disclosure.

The financial information 302 is then sent over the network (102) to the on-line lending system (110). The on-line lending system (110) may then elect to request and receive other pertinent information from the prospective borrower. In one embodiment, the financial information 302 is part of the applicant credential data. In addition to requesting personal identification information 106, personal information 202, and financial information 302, as illustrated in FIGS. 1, 2, and 3, it will be clear to those of ordinary skill in the art having the benefit of this disclosure that other information could be requested and transmitted to the on-loan lending system. For example, educational background information or a credit history may be requested.

Once all of the requested information is received, the resulting compilation of data provided by the prospective borrower, as discussed above, constitutes the applicant credential data. In one embodiment, following the completion of the entire electronic loan application, the applicant credential data is transmitted to the on-line lending system (110) via the network (102). Each page of request information may be transmitted individually to the on-line lending system (110) and complied upon receipt as applicant credential data.

Figure 4:
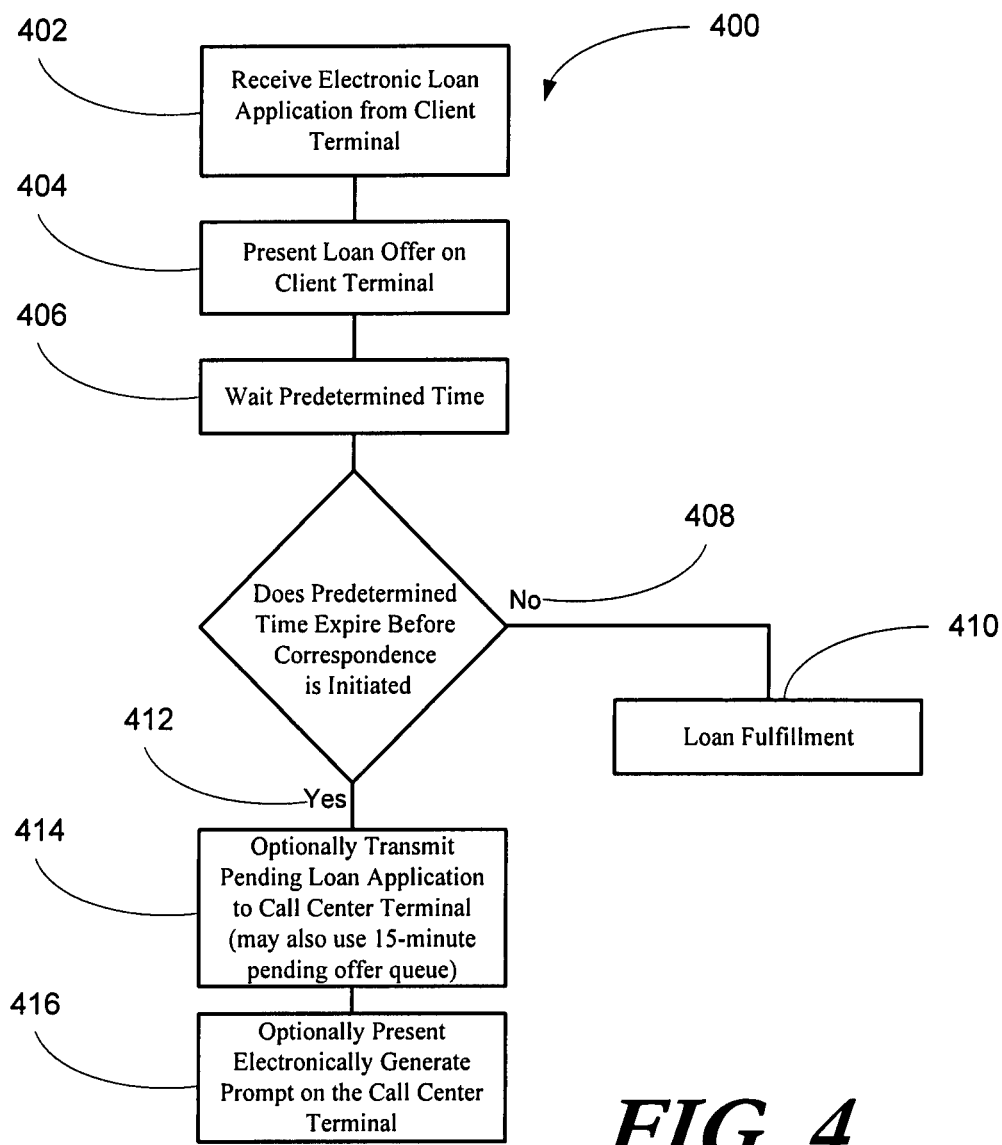
FIG. 4 illustrates one embodiment of a method for post offer borrower query for an on-line lending system in accordance with the invention.

Turning to FIG. 4, illustrated therein is one embodiment of a method 400, which may employ the on-line application discussed above with reference to FIGS. 1-3, for post offer borrower query for the on-line lending system (110). At step 402, the on-line lending system (110) receives the electronic loan application (100) from the client terminal (101) over the network (102). The electronic loan application (100), which includes applicant credential data, is then processed by the on-line lending system (110) to determine whether the prospective borrower qualifies for a loan. Where the prospective borrower does qualify for a loan, the electronic loan application (100) and corresponding applicant credential data may be used by the on-line lending system (110) to determine what the terms and conditions of the loan may be.

In one embodiment, the on-line lending system (110) retrieves additional financial information that is not included with the applicant credential data. For example, where an applicant has not provided a sufficient work payment history, the on-line lending system (110) may need to retrieve employment confirmation from the prospective borrower's employer. Similarly, the on-line lending system (110) may want to retrieve credit reports prior to extending a loan offer. The additional financial information may include credit reports, banking statements, employment information, residence information, or other background information. The on-line lending system (110) analyzes the applicant credential data and additional financial information, by way of a decisioning engine, to determine whether the prospective borrower should be presented with one or more loan offers.

Figure 5:
FIG. 5 illustrates one embodiment of an at least one loan offer presented on a client terminal in accordance with the invention.

At step 404, provided the prospective borrower meets criteria for a loan set in the decisioning engine, the on-line lending system (110) presents electronically one or more loan offers on the client terminal 101. Turning briefly to FIG. 5, illustrated therein is one embodiment of the one or more loan offers 500 presented, via the Network 102, on the client terminal 101. In the illustrative embodiment of FIG. 5, two different loan offers 506 are presented. While two loan offers are shown, one, three, or four or more loan offers could equally be shown. Multiple loan offers may be presented when the prospective borrower has optional payment schedules. Additionally, multiple loan offers may be presented when the prospective borrower qualifies for differing loan amounts.

Figure 6:
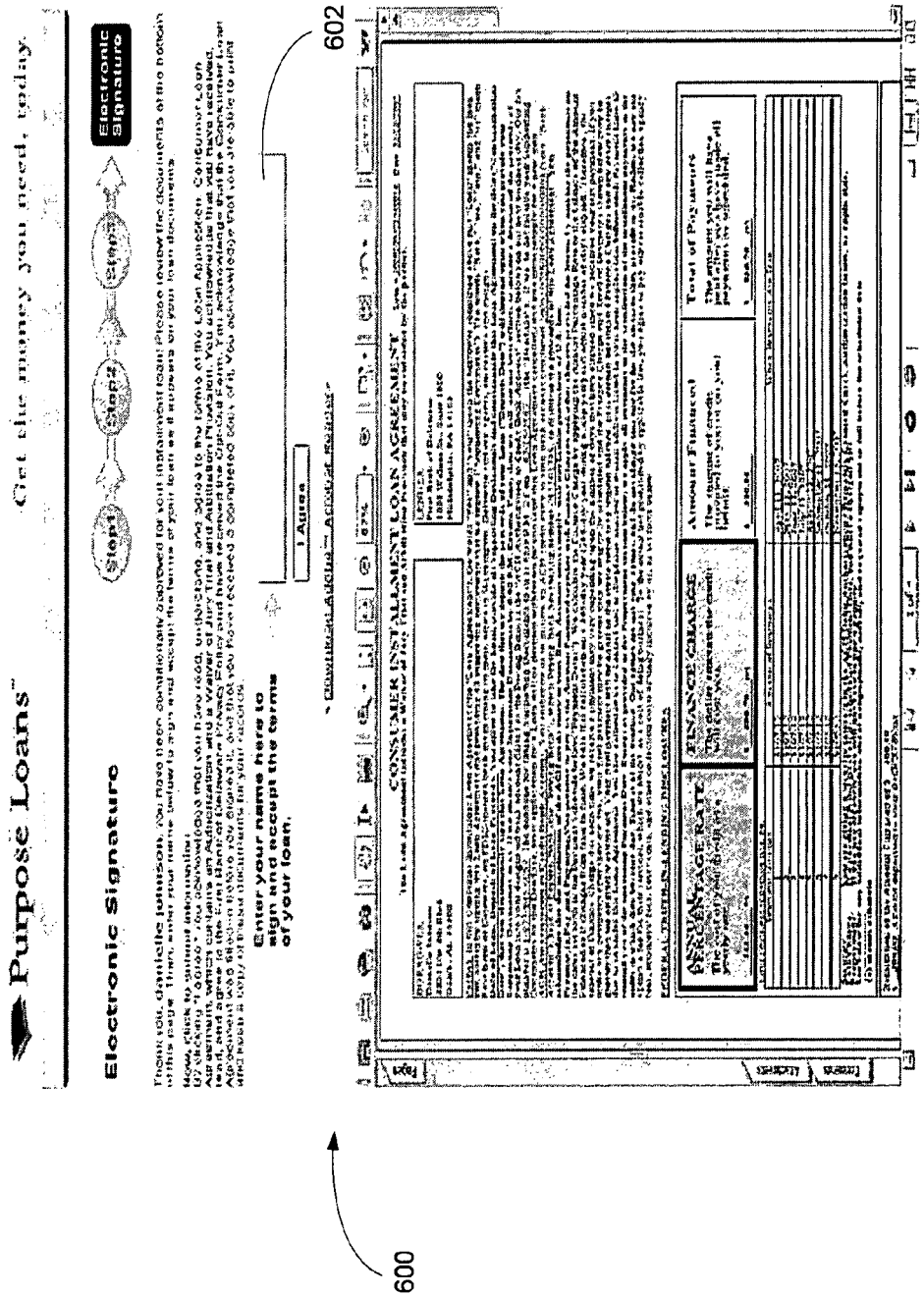
FIG. 6 illustrates one embodiment of a terms and conditions agreement presented on a client terminal in accordance with the invention.

Turning briefly to FIG. 6, illustrated therein is one embodiment of the terms and conditions agreement 600 presented on the client terminal (101). In one embodiment, a terms and conditions agreement 600 may be presented along with the one or more loan offers (500). The terms and conditions agreement 600 may, among other things, inform the prospective borrower about their fiscal responsibility upon accepting a loan offer. Such fiscal responsibility may include knowledge of annual percentage rates, finance charges, total amount financed, and amount of monthly payments. Privacy information and other processing information may additionally be presented.

In one embodiment, the terms and conditions agreement 600 includes a request for the terms and conditions agreement 600 to be executed. Execution of the terms and conditions agreement 600 may be required before any one loan can be completed. The execution may be implemented directly by electronic signature 602 via the client terminal (101) or, alternatively, a printed copy of the signed executed terms and conditions agreement may be signed by the prospective borrower and delivered to the lender by facsimile or mail.

In one embodiment, when the one or more loan offers are presented, the customer is placed into a pending offer queue. At this time, a timer is started. In one embodiment, this timer is a fifteen minute timer.

Once the timer has begun, the one or more loan offers are presented to the prospective borrower. Once the prospective borrower selects an offer, the prospective borrower is removed from the pending offer queue. Where the prospective borrower fails to select an offer, the prospective borrower remains in the pending offer queue and is transmitted to the on-line lending system after the timer expires, which in one embodiment is 15 minutes from the presentation of the one or more loan offers.

In another embodiment following the presentation of the one or more loan offers, the on-line lending system (110) waits for an electronic signal from the client terminal (101) indicating acceptance of one of the loan offers. In one embodiment, the on-line lending system (110) waits a predetermined time at step 406. For example, the on-line lending system (110) may wait for 5, 10, or 15 minutes for the prospective borrower to select a loan and click an acceptance button via the client terminal. In one embodiment, the predetermined time is a calculated average response time determined by the on-line lending system (110) based upon a sample of loan offers presented and the corresponding acceptance times.

Where the prospective borrower transmits the electronic signal indicating the acceptance of the at least one loan offer to the on-line lending system (110) within the predetermined time, loan fulfillment may begin at step 408. Where an executed terms and conditions agreement 600 is also submitted, the application process may be completed. Loan fulfillment may include crediting an account of the prospective borrower, perhaps by ACH or remote electronic check, for the amount of the loan offer at step 410.

Where the prospective borrower fails to select a loan and transmit the electronic acceptance signal within the predetermined time to the on-line lending system (110), or where the pending offer queue 15-minute timer expires, this is detected at step 412.

There are many situations where a failure to receive the electronic signal indicating acceptance of a loan offer may occur. In one situation, the prospective borrower may not be satisfied with the terms associated with any of the loan offers. In another situation, the prospective borrower may need time, in excess of the predetermined time, to make the decision of whether to accept any of the loan offers.

In any case, the lender operating the on-line lending system (110) may desire to contact the prospective borrower to follow-up on the loan offer. For example, the lender may want to ensure that no technical glitch has occurred. Further, the lender may want to discuss other lending options with the prospective borrower. The lender may further want to address any reservations the prospective borrower may have with the loan offers presented. The lender may additionally want to inquire why no loan offer was selected to further improve customer satisfaction.

To address these issues, embodiments of the present invention provide a system for a customer service representative to execute the follow-up communication. Further, embodiments of the present invention work to ensure that the follow-up occurs within a predetermined follow-up time.

(Note that the discussion of various figures set forth below includes select references to elements illustrated in FIG. 14. The detailed discussion of FIG. 14 then follows. Thus, in the following descriptions, elements selectively referenced from FIG. 14 will be initially set forth in parentheses.)

Turning again to FIG. 4, in one embodiment, at step 414, the loan offer (506) and the applicant credential data are electronically transmitted over the network (102) to a call upon failing to receive the electronic signal from the client terminal (101)—or upon expiration of the 15-minute pending offer queue timer—within at least the predetermined time. A customer service representative uses the call center terminal (1414) in initiating communication with the prospective borrower. The call center terminal (1414) may include a computer having access to the network (102) and a telephone.

In one embodiment, the customer service representative initiates communication with the prospective borrower by calling the prospective borrower on the telephone upon receiving an electronically generated prompt (1415) on the call center terminal (1414) at step 416. The electronically generated prompt (1415) includes information about both the loan offer and the prospective borrower. For example, the electrically generated prompt (1415), which may comprise a graphical information presentation on a computer, includes both the loan offer (500) and the applicant credential data. The combination of the loan offer and applicant credential data is referred to herein as the "pending loan offer application". The data associated with the pending loan offer application provides the customer service representative with information needed to both initiate communication with the prospective borrower, such as a home telephone number, and information to discuss the lack of acceptance of the loan offer. For example, the pending loan offer application may include the loan offers presented and the amount of time that has elapsed since the offers were presented. Other information may be presented as well.

In an exemplary embodiment, the on-line lending system (110) is capable of receiving and processing a large number of electronic loan applications. In such an embodiment, there may be a large number of unaccepted loans due to the large number of loan applications processed. As such, a large number of pending loan offer applications may be transmitted to the call center terminal (1414). Multiple customer service representatives may be working on multiple call center terminals to accommodate the pending loan offer application workload. The multiple call center terminals, within a single facility, comprise a call center (1416). The call center (1416) includes a computer system configured direct the received pending loan offer applications to the call center terminal (1414). In one embodiment, the computer system comprises a call center terminal configured to receive pending loan offer applications and route them to other call center terminals.

Figure 7:
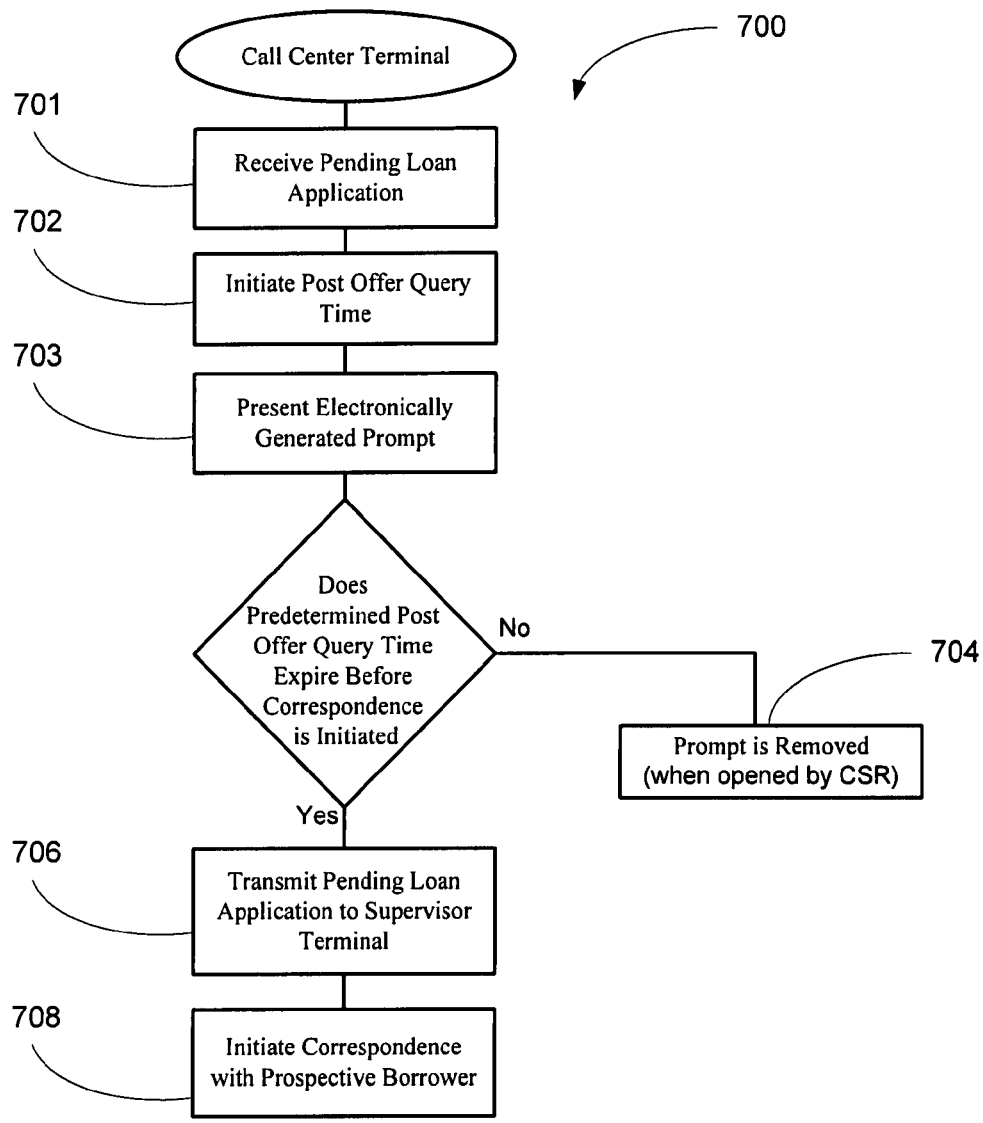
FIG. 7 illustrates one embodiment of a method configured to present a prompt to initiate communication with a prospective borrower before the expiration of a timer in accordance with the invention.

To ensure that the pending loan offer applications are addressed in a timely manner, timers and queues may be used. The timers and queues help to ensure that communication between the prospective borrower and the customer service representative is initiated in a timely manner. Turning now to FIG. 7, illustrated therein is one embodiment of a method 700 to present an electronically generated prompt (1415) to initiate communication with the prospective borrower before the expiration of a timer. The timer, which may be for a predetermined duration such as 15 minutes, assists the call center terminal in delivering pending loan offer applications to the customer service representatives. For example, in one embodiment, the call center terminal (1414) is configured to have a customer service representative call each prospective borrower associated with a pending loan offer application within a predetermined time. In such an embodiment, the timer may be started when the pending loan offer application is received. Pending loan offer applications with less time remaining on the timer will be forwarded to the customer service representatives before those with more time remaining. Customer service representative supervisors may further track the time of communication between the customer service representative and the prospective borrower by way of a timer. Further, pending applications may be forwarded to priority queues where a customer service representative has not contacted the prospective borrower upon expiration of the timer.

In one embodiment, when the call center terminal receives the pending loan offer application at step 701, the predetermined post offer query timer starts at step 702. At step 703, a prompt is electronically generated on the call center terminal (1414) for initiating communication with the prospective borrower. In one embodiment, the post offer query timer is set for a time period of fifteen minutes or less.

Figure 8:
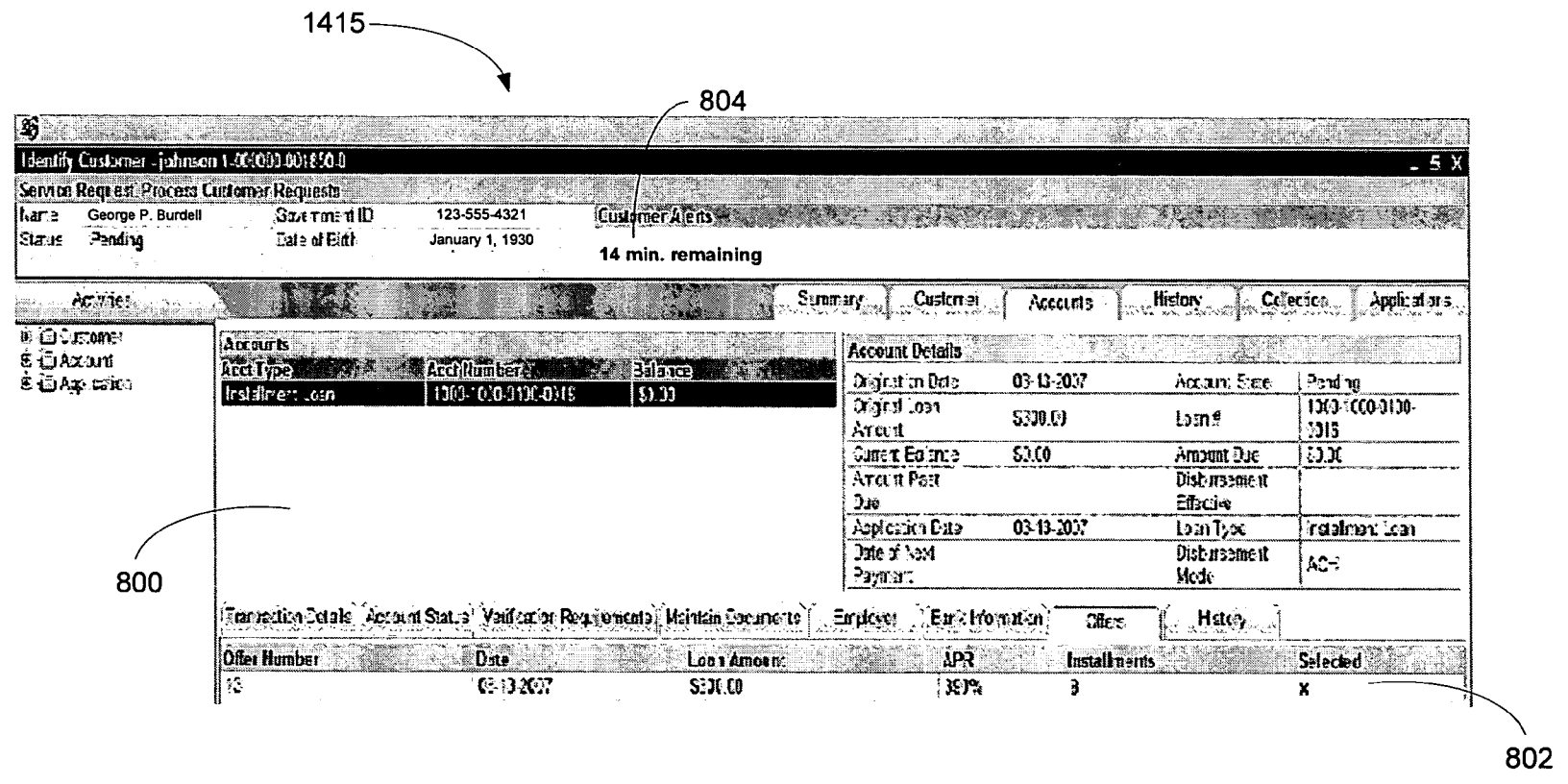

Turning briefly to FIG. 8, illustrated therein is one embodiment of the electronically generated prompt (1415) presented on the call center terminal (1414). Specifically, FIG. 8 illustrates a pending loan offer application 800 comprising a loan offer, a loan offer not being accepted indicator 802, applicant credential information, and an amount of post offer query time remaining 804. Before the post offer query timer expires, the customer service representative should attempt to initiate communication with the prospective borrower. If the customer service representative initiates communication, the electronically generated prompt (1415) is removed and a new electronically generated prompt may present itself at step 704. In one embodiment, the new electronically generated prompt (1415) comprises a new pending loan offer application. The new electronically generated prompt (1415) may also comprise future actions associated with the pending loan offer application following communication with the prospective borrower, such as transferring funds or altering the pending loan offer application 800 to a completed loan application.

There are instances, however, where the customer service representative may be unable to initiate communication within the post offer query time. One such instance may involve the customer service representative being in communication with another prospective borrower regarding an earlier received pending loan offer application. Additionally, at certain times, there simply may not be enough customer service representatives available to handle the volume of pending loan offer applications. In such a situation the pending loan offer application may transmitted to a supervisor terminal at step 706 if communication with the prospective borrower is not initiated within the post offer query time. Where this occurs, a supervisor, stationed at the supervisor terminal, then is able to initiate communication with the prospective borrower, at step 708. In one embodiment, the number of pending applications received by the supervisor terminal may be an indicator of call center efficiency. For instance, a large number of pending applications received by the supervisor may indicate either an insufficient number of call center terminals for initiating communication. A supervisor may elect to add more customer service representatives where the condition continues for an extended period of time.

Figure 9:
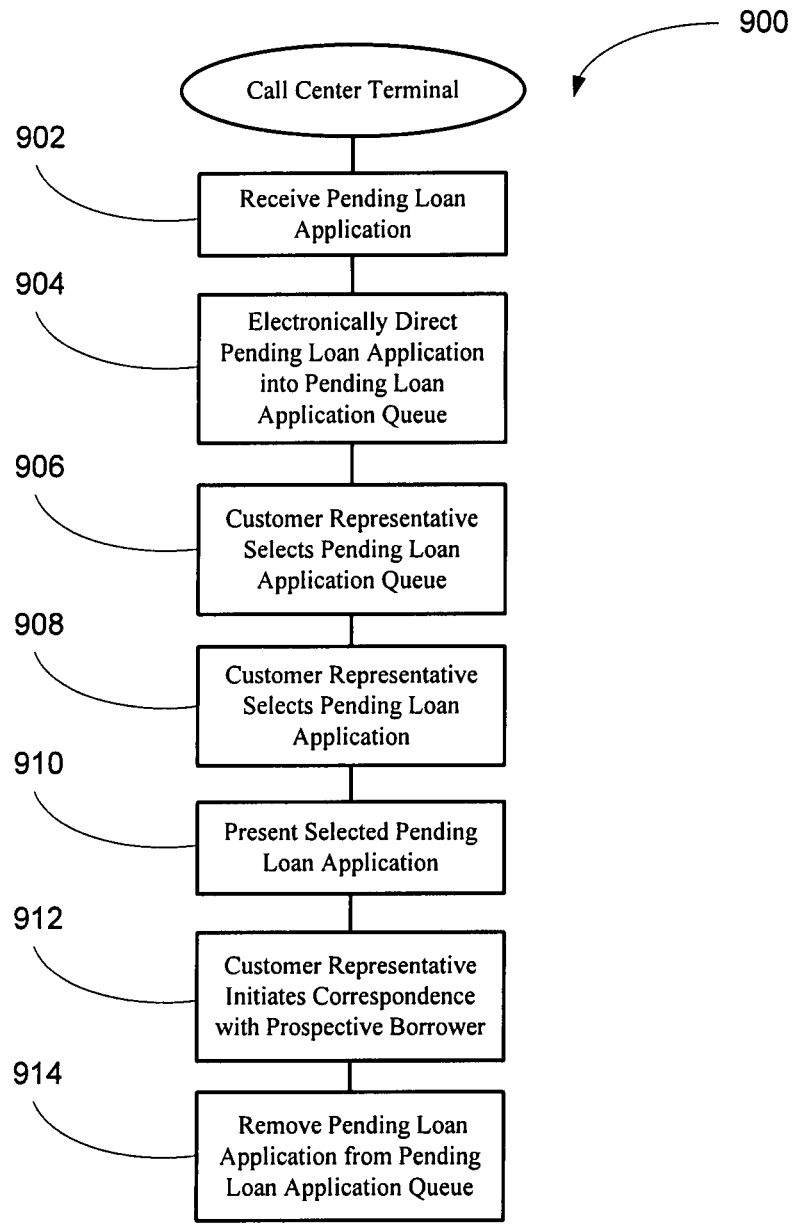
FIG. 9 illustrates one embodiment of a method implementing queuing structures for initiating communication with a prospective borrower regarding their pending loan offer application in accordance with the invention.

Turning now to FIG. 9, illustrated therein is one embodiment of a method 900 which implements queuing structures for initiating communication with a prospective borrower. In one embodiment, the call center terminal comprises a queue (1422). One or more queues may be configured in the call center terminal. The queue (1422) may be presented to the customer service representative or the supervisors on their respective terminals. In one embodiment, pending loan offer applications received by the call center terminal at step 902 are electronically directed into a call center queue at step 904. Opening the call center queue at step 906 presents pending loan offer applications to the customer service representative.

Briefly turning to FIG. 10, illustrated therein is one embodiment of the plurality of queues 1000 presented on the call center terminal (1414) for selection by a customer service representative. As illustrated, the plurality of queues 1000 comprises queues associated with lending service actions, specifically, actions relating to the processing of the electronic loan application (100). Some of these queues include the call center queue 1002, a supervisor queue 1004, and a manager queue 1006.

Figure 11:
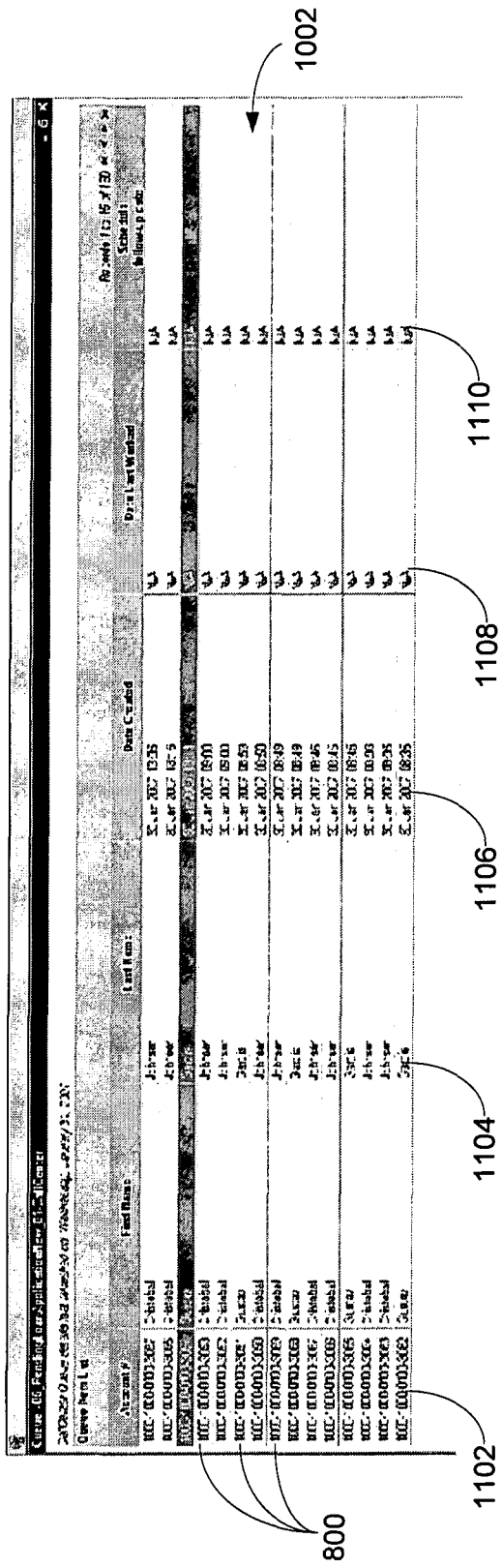
FIG. 11 illustrates one embodiment of a pending loan offer application queue configured to present a plurality of pending loan offer applications to a customer service representative in accordance with the invention.

Turning briefly to FIG. 11, illustrated therein is one embodiment of the call center queue 1002 configured to present at least one pending loan offer application 800 to a customer service representative. As illustrated, the call center queue 1002, which may include pending loan offer applications, comprises the account number 1102, name 1104, date created 1106, date last worked 1108, and schedule follow-up date 1110 of each pending loan offer application. Other information associated with the pending loan offer applications may also be listed.

In one embodiment, each call center terminal comprises a call center queue (1002). Pending loan offer applications received by the call center (1416) are electronically directed into the call center queue (1002) of the call center terminal (1414). In one embodiment, a random number is attached to the electronic loan application (100) received from the client terminal (101). The random number may be paired with the pending loan offer application. The random number determines to which pending loan offer application queue the pending loan offer application will be electronically directed. Random distribution of pending loan offer applications may provide one method for decreasing the number of delayed initiations of communication.

Turning back to FIG. 9, at step 908, the call center terminal (1414) selects a pending loan offer application (800) listed in the call center queue (1002). In one embodiment, the call center terminal (1414) selects the pending loan offer application (800) on a First In, First Out (FIFO) basis. This facilitates the customer service representative initiating communication with the prospective borrower whose associated pending loan offer application has resided in the call center queue (1002) for the longest time.

Figure 12:
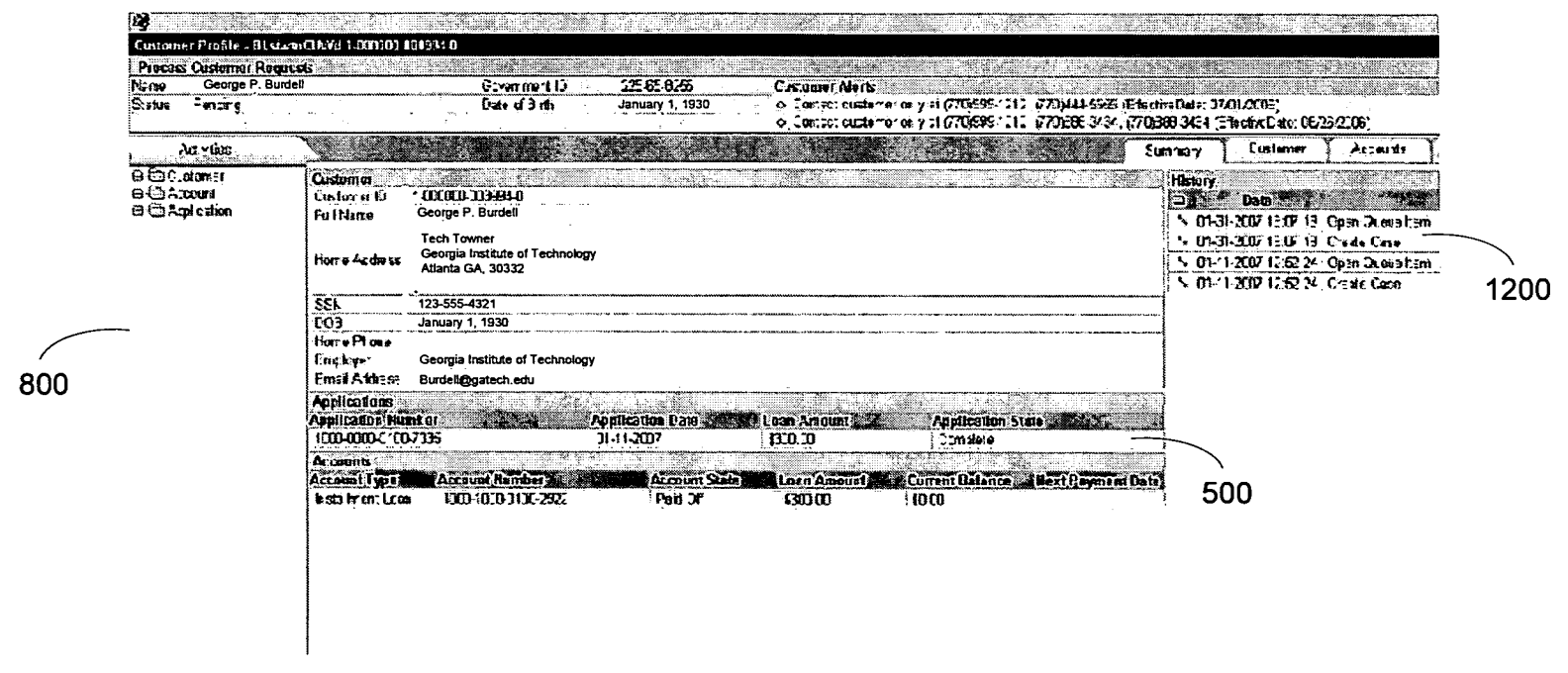

Once a pending loan offer application (800) has been selected, the call center terminal (1414) presents the pending loan offer application (800) to the customer service representative at step 910. Turning briefly to FIG. 12, illustrated therein is one embodiment of a pending loan offer application 800 presented on the call center terminal (1414). The loan offer 500, applicant credential data, and queue events 1200, such as when the queued item was opened, are illustrated in the pending loan offer application 800.

Turning back to FIG. 9, at step 912 the customer service representative initiates communication with the prospective borrower. The pending loan offer application 800 is removed from the call center queue 1002 at step 914. In one embodiment, after initiating communication, the pending loan offer application 800 is electronically directed to another queue, such as a processed loan application queue.

Figure 13:
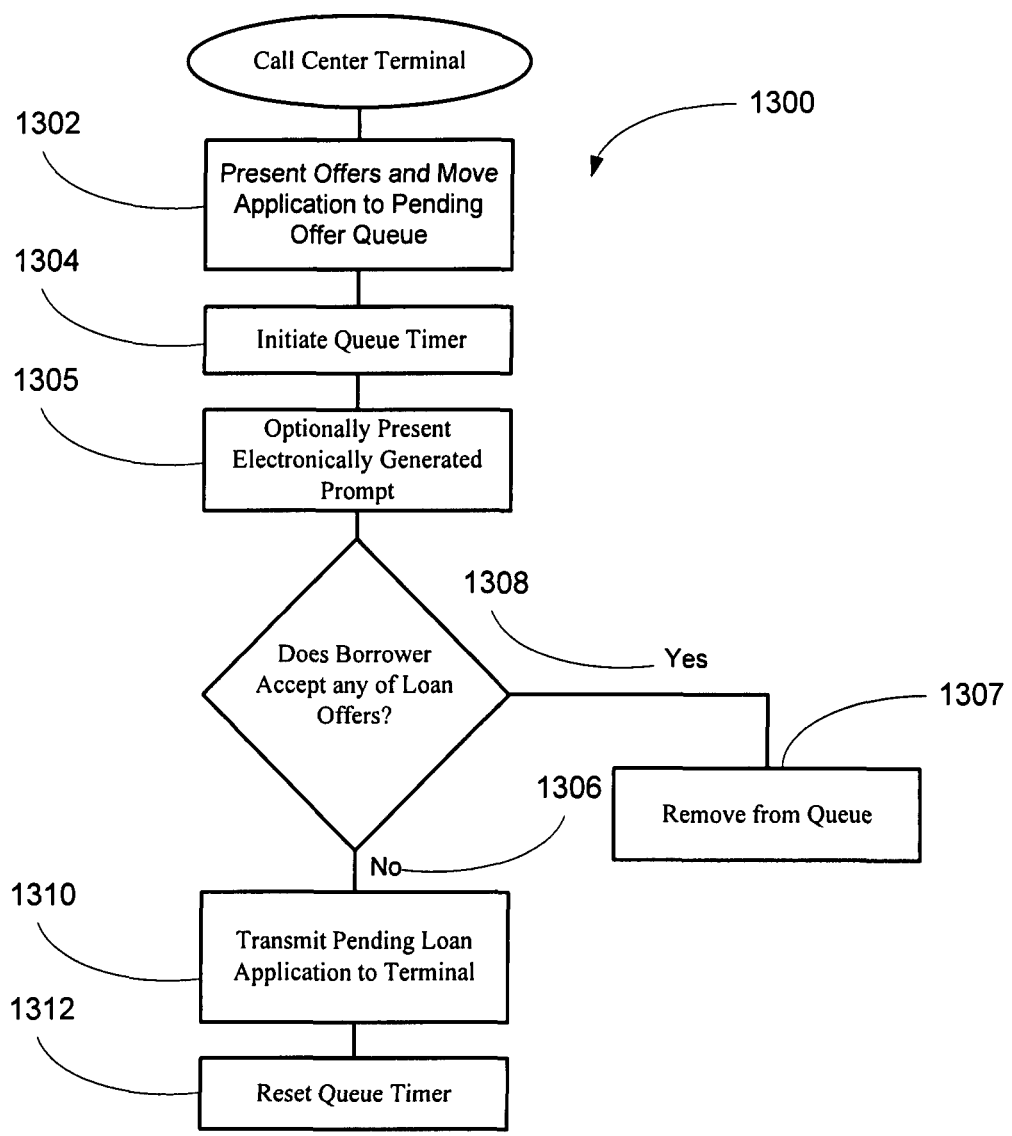
FIG. 13 illustrates one embodiment of a method for presenting a prompt to initiate communication with a prospective borrower comprising a combination of a queue and a timer in accordance with the invention.

Turning now to FIG. 13, illustrated therein is one embodiment of a method 1300 for presenting the electronically generated prompt (1415) implementing both queuing structures and at least one timer.

At step 1302, one or more loan offers are presented to the prospective borrower. The prospective borrower and his application are moved the pending loan offer application (800) is electronically directed to the pending loan offer queue at the call center. Upon presentation of the pending loan offer application (800), a queue timer is initiated at step 1304.

At step 1305, an optional electronically generated prompt (1415) may be presented on the call center terminal (1414). Such a prompt may be as simple as presenting the application in a list. The prompt may be used for initiating communication with a prospective borrower. At decision result 1306, the prospective borrower has failed to select a presented loan offer within the expiration of the timer, which may be 15 minutes as discussed above. Thus, a customer service representative may desire to initiate communication with the prospective borrower. Where a presented loan offer is selected, the pending loan offer application (800) is then removed from the queue at step 1307.

To facilitate communication, the pending loan offer application is electronically directed to a customer service center terminal at step 1310. A second queue timer may be started at step 1312. Where the second timer expires, the application may be moved to a priority queue, such as a supervisor queue (1004). The supervisor queue (1004) presents the electronically generated prompt (1415) on the supervisor terminal (1420) for initiating communication with the prospective borrower. In one embodiment, the queue timer is reset upon receipt of the pending loan offer application (800) by the supervisor terminal (1420). If the queue timer expires a second time, the pending loan offer application (800) may be electronically directed to a third terminal or queue, such as the manager queue (1006). The method of electronically directing the pending loan offer application (800) after each expiration of the queue timer may continue, with the pending loan offer application (800) being continually moved to a higher priority queue, until communication is finally initiated. In one embodiment, the supervisor queue (1004) works in conjunction with the priority queue. By way of example, delayed pending loan offer applications are transmitted to both the priority queue and the supervisor queue. The priority queue presents the electronically generated prompt (1415) to the customer service representative for initiating communication while the supervisor queue (1004) keeps track of the number and source of delayed pending loan offer applications for later analysis.

Figure 14:
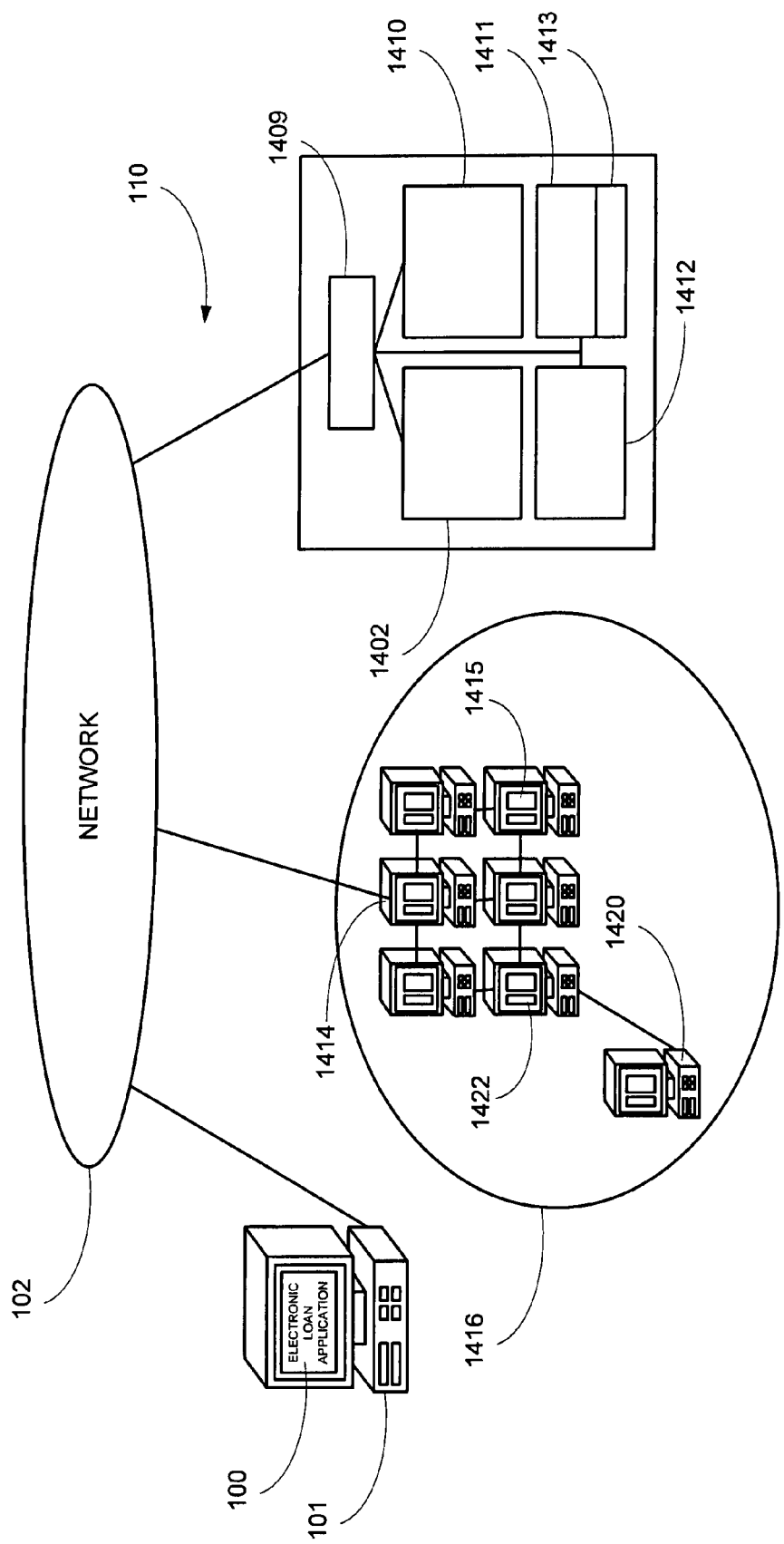
FIG. 14 illustrates one embodiment of an on-line lending system configured for post offer borrower query in accordance with the invention.

Turning to FIG. 14, illustrated therein is one embodiment the on-line lending system 110 configured for post offer borrower query. In one embodiment, communication between the on-line lending system 110 and the client terminal 101 is facilitated by a transceiver 1409 utilizing a data switching network protocol by way of the network 102. The transceiver 1409 is connected to each component comprising the on-line lending system and facilitates communications between each component and the network 102 in accordance with the invention.

The on-line lending system 110 of FIG. 14 comprises a loan application collection module 1402. The loan application collection module 1402 is configured to receive the electronic loan application 100 from the client terminal 101. The loan application collection module 1402 may actively retrieve data as it is entered into the electronic loan application 100. In contrast, data entered into the electronic loan application may be stored locally in a cache on client terminal 101 and once all data is collected, it is transmitted from the cache to the loan application collection module 1402.

In one embodiment, the on-line lending system 1400 comprises a loan offering module 1410. The loan offering module 1410 is configured to present the loan offer (500) and the terms and conditions agreement (600) to the client terminal 101. In one embodiment, a financial inquiry module 1416 is connected to the loan offering module 1410. The financial inquiry module 1411 uses the applicant credential data to obtain additional financial information associated with the prospective borrower. For example, the financial inquiry module 1411 contacts a bank identified in the applicant credential data and requests banking records associated with the prospective borrower.

In one embodiment, the financial inquiry module 1411 comprises a loan worthiness module 1413. The loan worthiness module 1413 is a decisioning engine configured to determine whether the prospective borrower should be presented with the loan offer (500). The loan worthiness module may use the applicant credential data, the retrieved additional financial information, or a combination thereof, to make the decision of whether to present the loan offer (500).

The on-line lending system 1400 further comprises a loan response module 1412. The loan response module 1412 waits to receive the electronic signal from the client terminal 101. If the electronic signal is not received in accordance with the invention, the loan response module 1412 is configured to transmit the pending loan offer application (800) to the call center terminal 1414.

The call center terminal 1414 is configured to present the electronically generated prompt 1415 for a customer service representative to initiate communication with the prospective borrower. In one embodiment, the call center terminal 1414 comprises a queuing module 1422. The queuing module 1422 is configured to create a plurality of multilayered queues for the implementation of queuing structures in accordance with the described methods discussed above. By way of example, the queuing module 1422 creates a test queue. The test queue contains queues A, B, and C. Queue A contains queue items x, y, and z. The queue module 1422 facilitates the selection of queue A then the selection of queue item z.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A method of post offer borrower query for an on-line lending system, the method comprising the steps of:
   receiving an electronic loan application over a network from a client terminal, the electronic loan application comprising applicant credential data;
   presenting electronically, over the network, on the client terminal, at least one loan offer;
   waiting at least a predetermined time for an electronic signal from the client terminal comprising an acceptance indication of the at least one loan offer;
   upon failing to receive the electronic signal from the client terminal within the at least a predetermined time, electronically transmitting the at least one loan offer and the applicant credential data to a call center terminal; and
   generating electronically a prompt on the call center terminal for a customer service representative to initiate communication with a prospective borrower.

2. The method of claim 1, wherein the step of generating electronically the prompt on the call center terminal for the customer service representative to initiate the communication with the prospective borrower comprises prompting the customer service representative to initiate the communication within a predetermined post offer query time.

3. The method of claim 2, wherein the communication comprises telephonic communication with the prospective borrower.

4. The method of claim 2, wherein the predetermined post offer query time comprises a period of less than fifteen minutes.

5. The method of claim 1, wherein the step of electronically transmitting the at least one loan offer and the applicant credential data to the call center terminal comprises electronically directing the at least one loan offer and the applicant credential data into a queue.

6. The method of claim 5, further comprising the step of attaching a random number to the applicant credential data upon receiving the electronic loan application.

7. The method of claim 6, further comprising the step of selecting the queue by using the random number as a selection criterion.

8. The method of claim 7, further comprising the step of sorting the queue on a FIFO basis.

9. The method of claim 5, further comprising the step of initiating a queue timer upon electronically directing the at least one loan offer and the applicant credential data into the queue.

10. The method of claim 9, wherein upon an expiration of the queue timer, the method further comprises the step of electronically directing the at least one loan offer and the applicant credential data into a priority queue and electronically directing the at least one loan offer and the applicant credential data to a supervisor terminal.

11. The method of claim 9, further comprising the step of resetting the queue timer upon electronically transmitting the at least one loan offer and the applicant credential data to a supervisor terminal.

12. The method of claim 1, wherein the client terminal comprises a web portal.

13. The method of claim 1, further comprising the steps of:
   presenting electronically, over the network, on the client terminal, at least a terms and conditions agreement;
   wherein the communication comprises a request to return, executed, the at least a terms and conditions agreement.

14. An on-line lending system for post offer borrower query, the on-line lending system, comprising:
   a loan application collection module, configured to receive an electronic loan application over a network from a client terminal, the electronic loan application comprising applicant credential data;
   a loan offering module, configured to present at least one loan offer to the client terminal over the network; and a loan response module, configured to wait at least a predetermined time for an electronic signal from the client terminal indicating acceptance of the at least one loan offer;

a call center terminal, configured to electronically generate a prompt for a customer service representative to initiate communication with a prospective borrower upon receiving the at least one loan offer and the applicant credential data from the loan response module, the loan response module transmitting the at least one loan offer and the applicant credential data upon failing to receive the electronic signal.

15. The on-line lending system of claim 14, further comprising a financial inquiry module, configured to locate and extract financial information associated with the applicant credential data received by the loan application collection module.

16. The on-line lending system of claim 15, wherein the financial inquiry module further comprises a loan worthiness module configure to determine whether the at least one loan offer is presented to the client terminal.

17. The on-line lending system of claim 14, wherein the call center terminal electronically generates the prompt within a predetermined post offer query time.

18. The on-line lending system of claim 14, wherein the call center terminal further comprises a queuing module, configured to present the at least one loan offer and the applicant credential data to at least one customer service representative for initiating the communication with the prospective borrower.

19. The on-line lending system of claim 18, wherein the queuing module implements FIFO for presenting the at least one loan offer and the applicant credential data to the at least one customer service representative.

20. The on-line lending system of claim 19, wherein the queuing module comprises a queue timer, wherein initiating the communication with the prospective borrower occurs before expiration of the queue timer.

* * * * *